July 14, 1959 — R. McLAUGHLIN — 2,894,392
ONE-WAY TEMPERATURE COMPENSATION FOR
PRESSURE MEASURING INSTRUMENTS
Filed March 29, 1956 — 2 Sheets-Sheet 1
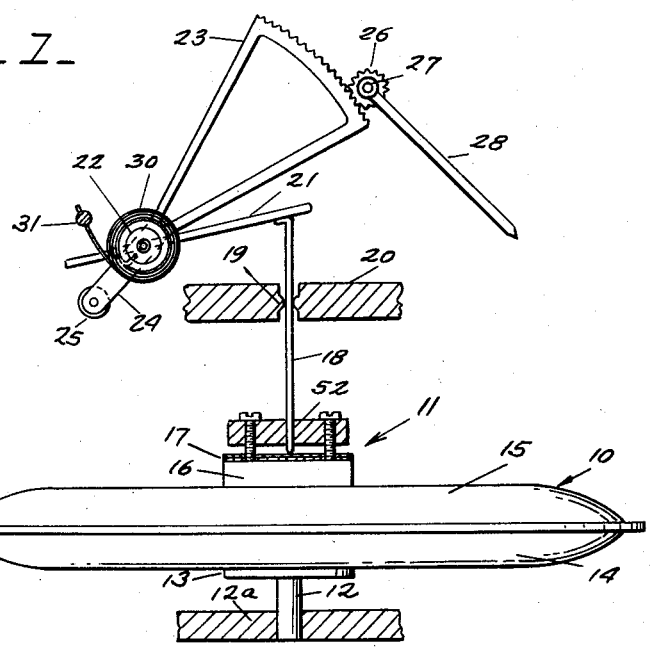
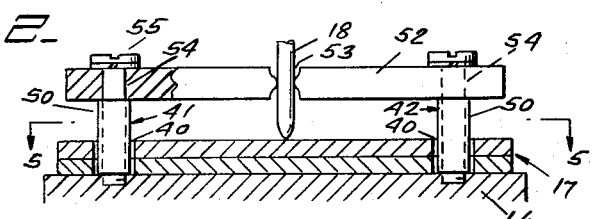
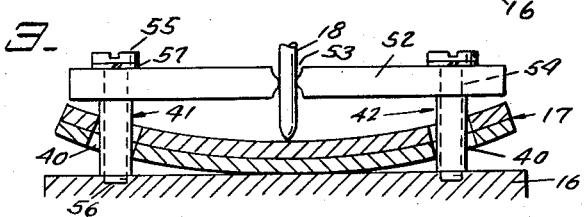
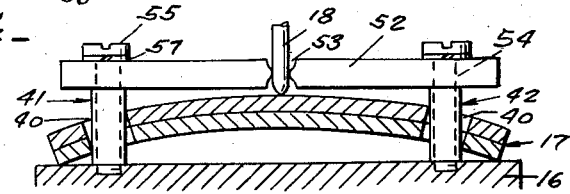
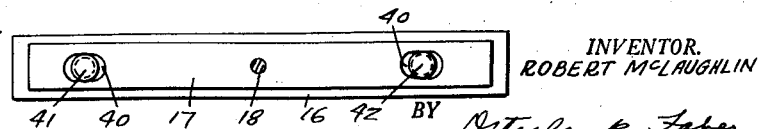
INVENTOR.
ROBERT McLAUGHLIN
BY
ATTORNEYS July 14, 1959  R. McLAUGHLIN  2,894,392
ONE-WAY TEMPERATURE COMPENSATION FOR
PRESSURE MEASURING INSTRUMENTS
Filed March 29, 1956  2 Sheets-Sheet 2
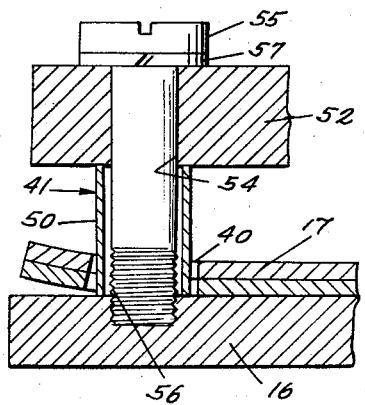
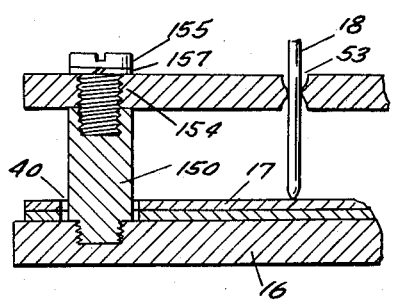
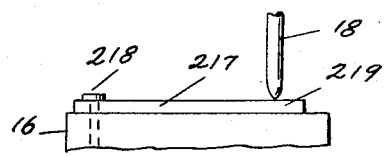
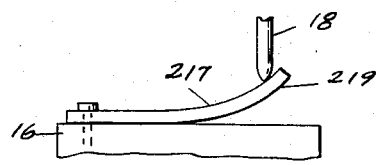
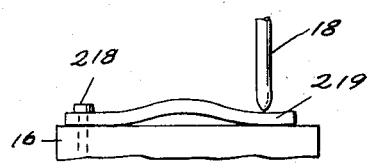
INVENTOR.
ROBERT McLAUGHLIN
BY Ostrolenk, Faber,
Gerb & Soffen
ATTORNEYS

United States Patent Office 2,894,392
Patented July 14, 1959

2,894,392

ONE-WAY TEMPERATURE COMPENSATION FOR PRESSURE MEASURING INSTRUMENTS

Robert McLaughlin, Elmhurst, N.Y., assignor to Kollsman Instrument Corporation, Elmhurst, N.Y., a corporation of New York Application March 29, 1956, Serial No. 574,897

5 Claims. (Cl. 73—393)

My present invention relates to pressure measuring instruments and more particularly to means for automatically adjusting or compensating the indication of such instruments in accordance with temperature changes in one direction from a predetermined median temperature while at the same time providing no change or adjustment in the indication for temperature variations from the predetermined median temperature in the opposite direction.

Thus, where the output of the instrument is such that no significant variations in adjustment are required at temperatures below a predetermined median temperature, my novel one-way temperature compensating device may be utilized in such manner that no variations in the indication occur below such median temperature while at the same time automatic adjustment of the output or the indication of the instrument is obtained for temperatures above the predetermined median.

In pressure responsive instruments, particularly aircraft instruments, an aneroid capsule or diaphragm is used which as is well known in the art is an evacuated element which may be collapsed to varying degrees for varying external pressures and which is spring biased toward the expanded position so that as its external pressure is decreased, the spring bias serves to correspondingly expand the capsule.

In various types of instruments such as pressure ratio transmitters, altimeters, machmeters, maximum air speed indicators, true air speed indicators, vertical speed indicators, cabin pressure control devices and other devices utilized by or in aircraft, the characteristics of the instrument may be such that at and beyond a certain temperature its output or indication requires no correction, while as the temperature changes in the other direction, a corresponding compensation or correction may be required.

In the operation of such pressure responsive and pressure controlled systems, the aneroid capsule or a plurality of aneroid capsules are so connected as to drive a link or pin which through appropriate mechanism drives the indicating apparatus. The link or pin bears against or is connected to the center of one of the surfaces of the aneroid capsule. Where it merely bears against the center of the surface, biasing means is provided either inherently in the instrument or otherwise to hold it against such surface, such biasing means usually including or consisting of an anti-backlash spring arrangement which is used for driving the mechanism in a direction opposite to that in which the aneroid drives it and also taking up the backlash in the gearing.

My invention contemplates the utilization of a temperature responsive member which is deformable in response to temperature changes, the said member being deformable in one direction for variations in temperature in one direction from the predetermined median temperature and being deformable in an opposite direction for temperature changes in the opposite direction from the median temperature. The temperature responsive member is so arranged that when deformed in a first direction by, for instance, temperatures below the predetermined median, the center portion of the temperature responsive member or at least that portion against which the link or shaft bears does not move out of its initial plane while other elements of the temperature responsive member do move out of their initial plane. However, when deformed in the opposite direction by, for instance, temperatures above the predetermined median temperature, the portion of the temperature responsive member against which the link or shaft bears is deformed out of its initial plane to achieve a variation in the relative setting of the link or shaft with respect to the aneroid capsule.

More specifically, my invention contemplates the utilization of a bimetallic member so arranged that it is substantially flat at the predetermined median temperature and also so arranged that it is supported at the center of the aneroid capsule on a base or platform by means which will permit free bending of the bimetallic member in directions transverse to the plane of the bimetallic member. The link or shaft bears against the bimetallic member which in turn bears against a base member carried by the center of the capsule. When temperatures drop below the predetermined median, the ends of the bimetallic member curl outward and away from the base, the center of curvature and hence the stationary point of the bimetallic member being that point against which the link or shaft bears. Hence, no adjustment of the position of the link or shaft occurs with respect to the base member at the center of the diaphragm.

When, however, the temperature rises above the predetermined median, the bimetallic member curls in the opposite direction, the ends of the base member curl down toward the base lifting the center of the bimetallic member away from the base and since said center forms the bearing surface for the link or shaft, the position of the link or shaft with respect to the base and the center of the surface of the capsule on which the base is mounted is shifted or adjusted.

The primary object of my invention, therefore, is the provision of novel one-way temperature compensation for pressure measuring instruments.

Another object of my invention is the provision of one-way temperature compensation for aircraft instruments utilizing aneroid capsules or diaphragm capsules.

The foregoing and many other objects of the invention will become apparent in the following description and drawings in which:

Figure 1 is a schematic view showing one way in which my novel temperature compensating device may be mounted with respect to a pressure indicating instrument.

Figure 2 is an enlarged fragmentary view showing the compensating member of Figure 1.

Figure 3 is a view corresponding to that of Figure 2 showing the operation for movement of temperature in one direction from the median temperature, for instance, in the direction to decrease temperature.

Figure 4 is a view corresponding to that of Figure 2 showing the operation of the device for variation in temperature from the predetermined median in a direction opposite to that of Figure 3.

Figure 5 is a plan view of the mounting of the temperature compensating member partly in cross-section taken from line 5—5 of Figure 2.

Figure 5a is an enlarged detail view in cross-section of a portion of the structure of Figures 2 to 4.

Figure 6 is a cross-sectional view of a slightly modified method of mounting the elements of Figures 2 to 5.

Figures 7, 8 and 9 are schematic views of a modified form of the structure of Figures 2 to 5.

Referring to Figure 1, I have here shown an aneroid capsule 10 mounted in the interior of a housing 11 and supported by the post 12 in the frame 12a. The post 12 is connected to a center support 13 of one wall 14 of the capsule 10. The other wall 15 of the capsule 10 carries at the center thereof the center support or base 16. The base 16 carries the temperature compensating member 17 which bears against the link, shaft or pin 18.

It will thus be seen that as the capsule expands or contracts bringing the walls 15 and 14 further away from each other or closer to each other, owing to the fact that the outer central surface of the wall 14 is fixed, the base 16 on wall 15 will have the full movement of expansion or contraction. This movement is translated into corresponding longitudinal movement of the member 18. The member 18 is guided in bearing 19 in frame 20 to bear against link 21. Link 21 is keyed to the shaft 22. Shaft 22 carries the sector gear 23 which is counterbalanced by the opposite extension 24 carrying the weight 25. Sector gear 23 meshes with and drives pinion 26 on indicator shaft 27 which carries the indicator pointer 28 which may move over the dial, not shown.

Anti-backlash in the system and appropriate bias to maintain member 18 against the base 16 is provided by the coil spring 30 which is secured at one end to the shaft 22 and at the other end at 31 to a leg which in turn is carried by the frame.

It will thus be seen that variations in the transverse dimension (in Figure 1 the vertical dimension) of the capsule will result in corresponding movement of the member 18 and corresponding rotation of the pointer 28.

The means for obtaining the one-way temperature compensation above mentioned is shown at the bimetallic member 17 and is further shown by the fragmentary enlarged views of Figures 2 to 5. Essentially, the bimetallic member 17 lies flat on the base or support 16; the bimetallic member 17 is provided with the slots 40 which surround the pin members 41 and 42. As seen from a comparison of Figures 2 and 5, the slots 40 are so arranged that while the bimetallic member 17 is substantially centered by the pins 41 and 42, variations in curvature of the bimetallic member 17 will not interfere with mechanical mounting owing to the length of the slots 40.

The link or shaft 18 instead of as in the usual case bearing against the support 16 or being connected thereto bears against the upper surface of the bimetallic member 17. It will now be seen from a comparison of Figures 2 and 3 that upon curvature of the bimetallic member in one direction, for instance, for a decrease in temperature, the bimetallic member will curve in one direction, to form an arc tangent to the surface 16, the center of the arc being substantially the point of engagement between member 18 and the bimetallic member 17. Accordingly, while the ends of the bimetallic member 17 will curl outwardly from the base 16, the center will remain at its initial position and no adjustment of the relative position of member 18 and the support or base 16 will occur.

It will also be seen from a comparison of Figures 2 and 4 that upon variation in temperature in the opposite direction from the predetermined median, that is, for instance, on an increase in temperature, the bimetallic member 17 will curl in the opposite direction, that is, in a direction where a line along the upper surface of base 16 becomes a chord on the arc of curvature of member 17 so that the center of the member 17 moves away from the base or support 16, moving the member 18 away from the base or support 16 and thereby effecting a relative change in position or adjustment between the member 18 and the surface of base or support 16.

While I have described the members 41 and 42 as pins, for structural reasons the surfaces of members 41 and 42 on which the slots 40 of the bimetallic member 17 ride are sleeves 50. Since the member 18 will have some sliding longitudinal movement with respect to the surface 16 against which it rests, it is desirable to provide some bearing for the member 18 against such surface. Hence, a bearing plate 52 is provided having the bearing 53 in which the end of member 18 slides. The bearing plate is provided with opposite openings 54, 54 through which a screw 55 may be passed on each side, the said screw being threaded at its lower end into the tapped opening 56, 56 on each side of the base 16. Sleeves or bushings 50 on each screw 55 space the bearing plate 52 from the support 16, and lock washers 57, 57 are provided for each screw.

Since the bimetallic member 17 is carried by its slots 40, 40 on the pins 41, 42 formed by the respective sleeves 50, it will be obvious that before the assembly is completed of the bearing plate 52 with the support or base 16, the bimetallic member 17 is placed with its slots 40 over the sleeves 50.

It will also be obvious that where certain devices require compensation for temperature variations from the median in the direction of increase of temperature, the bimetallic member 17 will be placed on the pins so that its curvature will occur as shown in Figures 2, 3 and 4; and where the compensation is required for decrease in temperature, the bimetallic member will be turned over from the position of Figures 2, 3 and 4 before being mounted in the assembly.

It will also be seen that the capsule member and its temperature compensating member are a single integrated unit that may be handled as such so that no complex assembly of temperature compensating elements with the capsule within the housing are required.

In Figure 6 I have shown a slight modification of the mounting arrangement of Figures 2 to 5; where, instead of the screw 55 and sleeve 50 on each side a post 150 is provided which is a screw or press fit in base 16 and serves also as a pin support for slot 40 of bimetal 17. The upper end of post 150 is tapped at 149 and screw 155 and lock washer 157 operating through openings 154 in plate 152 fix the plate 152 at the upper end of posts 150.

In Figures 7, 8 and 9 I have shown a variation of my invention usable in instances where vibration is not a factor. The bimetal member 217 is fixed by rivet or other means 218 at one end on base 16 the other end 219 bearing against member 18. On increase in temperature, the end 219 will curl away from base 16 to adjust member 18; on decrease in temperature, the end 219 will curl away from base 16 to adjust member 18; on decrease in temperature the end 219 is stopped by the base 16 so that it cannot move to adjust in the opposite direction. Hence, on decrease in temperature, the bimetal member 217 will curl as shown in Figure 9. Obviously, a reverse type of compensation may be obtained by turning the bimetal member 217 over before attaching it. Appropriate curvature of end 219 of bimetal member 217 may be used to avoid shifting of member 18 during curling of bimetal member 217 as in Figure 9.

In the foregoing the invention has been described solely in connection with specific illustrative embodiments thereof. Since many variations and modifications of the invention will now be obvious to those skilled in the art, I prefer to be bound not by the specific disclosures herein contained but only by the appended claims.

I claim:

1. In a pressure responsive system comprising a driving member movable in one direction in response to increase in pressure and movable in another direction in response to decrease in pressure; an element driven by said driving member; a temperature compensating connection between said driving member and said driven element; said driven element bearing against said temperature compensating connection; said temperature compensating connection bearing against said driving member; said temperature compensating connection comprising a bimetallic strip adapted to arc in one direction for variation in temperature from a predetermined median temperature and adapted to arc in the other direction for variation in temperature in the other direction from the predetermined median temperature; said bimetallic member extending substantially parallel to and in engagement with the driving member at the predetermined median temperature; the portion of the bimetallic strip against which the driven element bears remaining substantially tangent to the driving member on arcing of the bimetallic strip in one direction; said portion moving away from said driving member on arcing of the bimetallic strip in the opposite direction whereby the driving member extends substantially as a chord on the arc formed thereby.

2. In a pressure responsive system comprising a driving member movable in one direction in response to increase in pressure and movable in another direction in response to decrease in pressure; an element driven by said driving member; a temperature compensating connection between said driving member and said driven element; said driven element bearing against said temperature compensating connection; said temperature compensating connection bearing against said driving member; said temperature compensating connection comprising a bimetallic strip adapted to arc in one direction for variation in temperature from a predetermined median temperature and adapted to arc in the other direction for variation in temperature in the other direction fom the predetermined median temperature; said bimetallic member extending substantially parallel to and in engagement with the driving member at the predetermined median temperature; the portion of the bimetallic strip against which the driven element bears remaining substantially tangent to the driving member on arcing of the bimetallic strip in one direction; said portion moving away from said driving member on arcing of the bimetallic strip in the opposite direction whereby the driving member extends substantially as a chord on the arc formed thereby; said driving member carrying a pair of pins; openings adjacent opposite ends of the bimetallic member loosely engaging said pins.

3. In a pressure responsive system comprising a driving member movable in one direction in response to increase in pressure and movable in another direction in response to decrease in pressure; an element driven by said driving member; a temperature compensating connection between said driving member and said driven element; said driven element bearing against said temperature compensating connection; said temperature compensating connection bearing against said driving member; said temperature compensating connection comprising a bimetallic strip adapted to arc in one direction for variation in temperature from a predetermined median temperature and adapted to arc in the other direction for variation in temperature in the other direction from the predetermined median temperature; said bimetallic member extending substantially parallel to and in engagement with the driving member at the predetermined median temperature; the portion of the bimetallic strip against which the driven element bears remaining substantially tangent to the driving member on arcing of the bimetallic strip in one direction; said portion moving away from said driving member on arcing of the bimetallic strip in the opposite direction whereby the driving member extends substantially as a chord on the arc formed thereby; said driving member carrying a pair of pins; openings adjacent opposite ends of the bimetallic member loosely engaging said pins and a bearing plate supported by said pins for retaining said bimetallic member on said pins and having a bearing for said driven element.

4. In a pressure responsive system comprising a capsule having at least one wall movable in response to variations in pressure at said capsule; a driving member movable in response to movement of said wall; an element driven by said driving member; a temperature compensating connection between said driving member and said driven element; said driven element bearing against said temperature compensating connection; said temperature compensating connection bearing against said driving member; said temperature compensating connection comprising a bimetallic strip adapted to arc in one direction for variation in temperature from a predetermined median temperature and adapted to arc in the other direction for variation in temperature in the other direction from the predetermined median temperature; said bimetallic member extending substantially parallel to and in engagement with the driving member at the predetermined median temperature; the portion of the bimetallic strip against which the driven element bears remaining substantially tangent to the driving member on arcing of the bimetallic strip in one direction; said portion moving away from said driving member on arcing of the bimetallic strip in the opposite direction whereby the driving member extends substantially as a chord on the arc formed thereby.

5. In a pressure responsive system comprising a capsule having at least one wall movable in response to variations in pressure at said capsule; a driving member movable in response to movement of said wall; an element driven by said driving member; a temperature compensating connection between said driving member and said driven element; said driven element bearing against said temperature compensating connection; said temperature compensating connection bearing against said driving member; said temperature compensating connection comprising a bimetallic strip adapted to arc in one direction for variation in temperature from a predetermined median temperature and adapted to arc in the other direction for variation in temperature in the other direction from the predetermined median temperature; said bimetallic member extending substantially parallel to and in engagement with the driving member at the predetermined median temperature; the portion of the bimetallic strip against which the driven element bears remaining substantially tangent to the driving member on arcing of the bimetallic strip in one direction; said portion moving away from said driving member on arcing of the bimetallic strip in the opposite direction whereby the driving member extends substantially as a chord on the arc formed thereby; said driving member carrying a pair of pins; openings adjacent opposite ends of the bimetallic member loosely engaging said pins.

References Cited in the file of this patent

UNITED STATES PATENTS

| 1,219,516 | Whittelsey | Mar. 20, 1917 |
| 1,388,032 | Frost | Aug. 16, 1921 |
| 2,016,560 | Rettich | Oct. 8, 1935 |
| 2,301,879 | Jenny | Nov. 10, 1942 |
| 2,612,781 | Evans | Oct. 7, 1952 |